L. EMBREY.
APPARATUS FOR STRETCHING DOUGH AND LIKE GLUTENOUS MATERIAL.
APPLICATION FILED APR. 14, 1915.

1,171,331.

Patented Feb. 8, 1916.
2 SHEETS—SHEET 1.

Inventor
L. Embrey
by /s/ —Atty

L. EMBREY.
APPARATUS FOR STRETCHING DOUGH AND LIKE GLUTENOUS MATERIAL.
APPLICATION FILED APR. 14, 1915.
1,171,331. Patented Feb. 8, 1916.
2 SHEETS—SHEET 2.
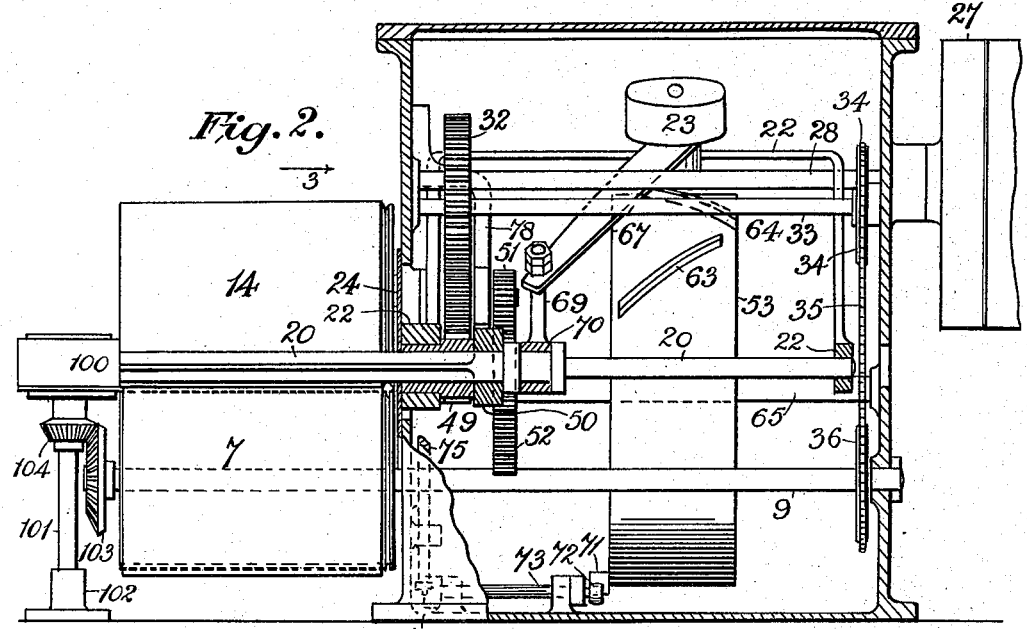
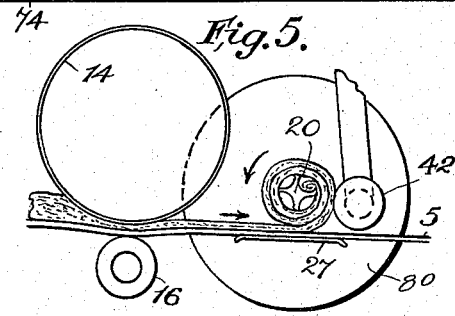
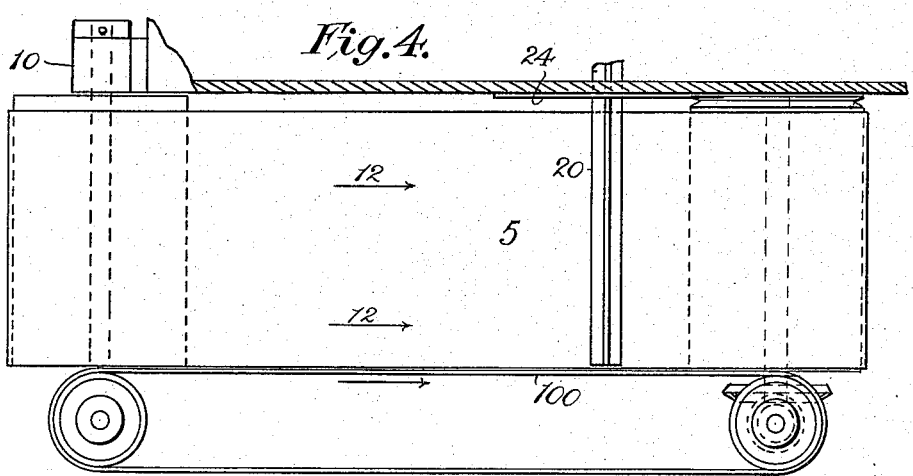
Inventor
L. Embrey
by [signature] Atty.

UNITED STATES PATENT OFFICE.

LAURENCE EMBREY, OF FENTON, ENGLAND.

APPARATUS FOR STRETCHING DOUGH AND LIKE GLUTENOUS MATERIAL.

1,171,331.  Specification of Letters Patent.  Patented Feb. 8, 1916.

Application filed April 14, 1915. Serial No. 21,225.

*To all whom it may concern:*

Be it known that I, LAURENCE EMBREY, a subject of the King of Great Britain, residing at Fenton, Staffordshire, England, have invented certain new and useful Improvements in Apparatus for Stretching Dough and like Glutenous Material, of which the following is a specification.

This invention relates to apparatus for molding dough by stretching or tensioning it after the manner described in the specification of my prior patent application Serial No. 819809 filed 19th Feb. 1914.

The object of the present invention is to provide improved apparatus for carrying the process described in the above mentioned specification into practical effect and more particularly the general object is to provide means for controlling the operation or degree of working or stretching applied to the dough.

To this end the invention comprises means for timing the discharge of the dough from the spindle after it has been wound a predetermined amount that is to say after a predetermined number of turns has been applied to the dough.

A further object of this invention is to insure proper engagement of the fed dough with the spindle.

The apparatus herein described is also designed to prevent access of flour, (such as is used for dusting the parts, coming in contact with the dough) to the mechanism which drives and controls the operation of the spindle.

Figure 1:
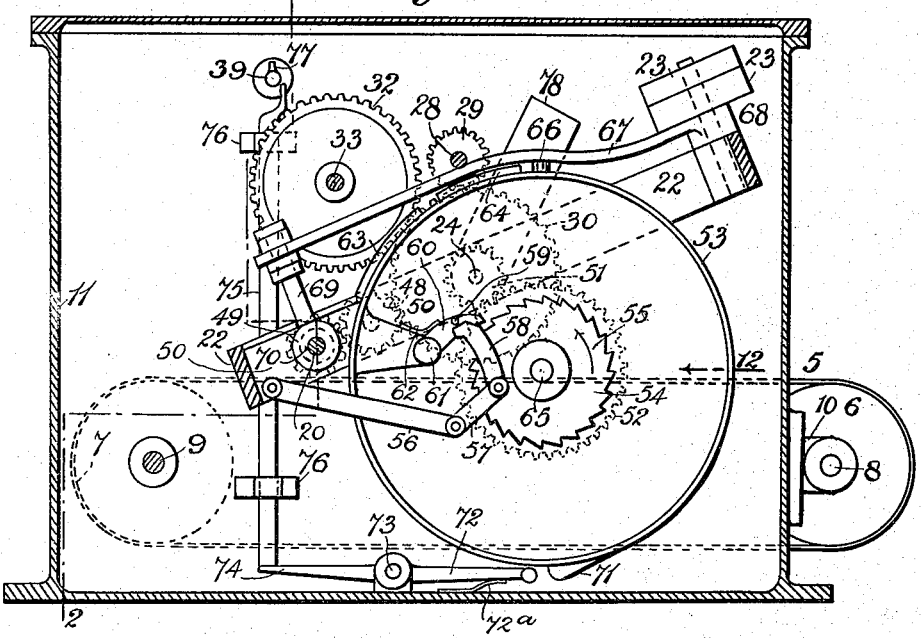
Figure 3:
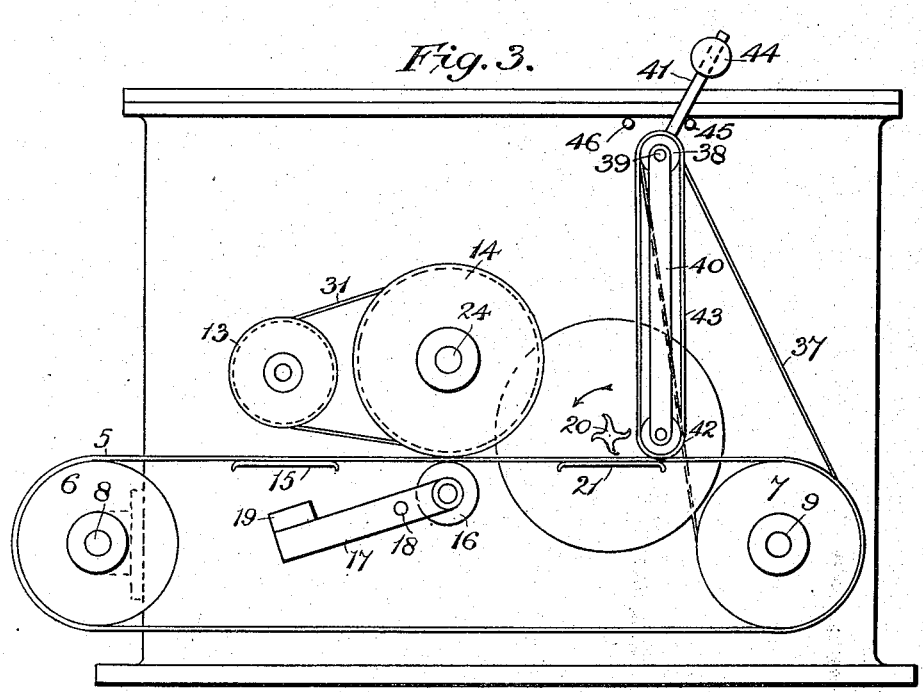

The invention and the method of carrying the same into practical effect will be more readily understood from the following description of one convenient form illustrated by way of example in the accompanying drawings in which:

Figure 1 is an elevation looking on one side of the apparatus with the side of the casing removed and the pivoted frame also in section. Fig. 2 is a section on the line 2—2 of Fig. 1. Fig. 3 is an elevation looking in the direction of the arrow 3 in Fig. 2. Fig. 4 is a partial plan view showing the arrangement of the feeding conveyer and the side conveyer at right angles thereto. Fig. 5 is a diagrammatic view of the rolling operation.

In carrying the invention into effect according to the form illustrated by way of example, the dough to be treated by stretching or what is called in the bakery trade "molding" is placed in a mass called sometimes a clot, on a conveyer band 5, which is mounted externally to the casing 11 on two free wheel drums 6 and 7. The conveyer band may conveniently be of moleskin, cloth or felt. The drums 6 and 7 are supported on spindles 8 and 9, the spindle 8 being mounted in brackets 10 fixed to the casing 11, while the spindle 9 passes across the two walls of the casing 11, and is mounted in bosses cast or formed thereon. The drums are connected by a suitable free wheel device, not specially illustrated, to their spindles so that the band 5 can only move in the direction of the arrow 12. Mounted above the band 5 there are two rollers 13 and 14 which are also covered with felt or moleskin. These rollers are driven at a slightly greater circumferential speed than the band 5, as this is necessary to prevent the dough adhering to the rollers and causing it to follow the band 5. The roller 13 reduces the clot of dough by pressing it down on the band 5 which is reinforced below the roller by a bridge 15. The strip of the thickness of the space between the roller 13 and bridge 15 passes on with the band 5, to the roller 14. Beneath the roller 14 the band is pressed upward by a counterbalanced roller 16 which is mounted to rotate freely in a frame 17 pivoted at 18 and weighted at 19. The weight 19 may if desired be adjusted to vary the pressure and thus control the thickness of the strip of dough. This roller has also the effect of thinning the ends and thereby giving a smoother outer surface when the strip is coiled as hereinafter described.

The strip of dough in the above treatment has been formed without breaking the structure of the gluten as the roller 13 first reduces the dough to a convenient thickness to be thinned out and extended by the rollers 14 and 16. The strip of dough now is carried by the band on to a spindle 20, which is rotating, being driven and pulled out and in at the proper times by the mechanism inside the casing 11 and thereinafter described. The spindle 20 is preferably of cross or similar profile in cross section as seen more clearly in Fig. 3. A bridge 21 similar to the bridge 15 is arranged under the spindle 20. The spindle 20 in rotating, grips the dough and coils it around itself, as shown in Fig. 5, thereby imparting a tension to the dough from within the mass without in any way puckering the dough. The fact that tension is applied to the dough without puckering is evident from a brief consideration. Any devices which coiled from the exterior of the dough must necessarily squeeze the dough en bloc and tension one side while it puckers the other so that there is no permanent stretch supplied to the dough. If a loaf molded by the means described is cut, the section shows regular circular striations of the gluten with elongated cells in it, a structure which those acquainted with the art of baking will understand is highly desirable, especially when it is associated, as in the case of the present process, with a total absence of broken or fractured strands of gluten. In other words the gluten is stretched but not broken. As the coil of dough increases in diameter the spindle rises; owing to its method of mounting in a pivoted frame 22. This frame is partially counterbalanced by weights 23 and is pivoted about the same center as the roller 14, that is to say, the center 24, in Fig. 1. By this means a light external pressure is applied to the coils as they pass on to the spindle and thereby one coil is lightly pressed to the coil immediately within it and the tension is thereby maintained without the aid of further mechanical means. This maintenance of the tension lasts throughout the process of proving.

When the coiling process has been carried out for a sufficient time, usually about 6 to 12 turns of the spindle suffice, the molded dough is removed from the spindle 20 by withdrawing the spindle from the projecting position shown in Fig. 2 to a position within the casing 11. The casing 11 is provided with an aperture to permit the rising movement of the spindle as the coil of dough "grows" and this aperture is closed to prevent ingress of dust by means of a disk 80 which moves upward with the spindle. The average amount of the stretch imparted to the dough strip is about 25%, that is to say, the average circumferential speed of the spindle is about 25% greater than the linear speed of the band 5, so that there is an actual extension of the strip in winding it on to the spindle 20.

Referring now more particularly to the mechanism for producing the above results, the entire mechanism is inclosed in a box or casing 11 and is consequently free from dust or like contamination, nor can the lubrication used get at the dough. The mechanism is driven by a pulley 27 mounted on a shaft 28 which passes the whole width of the casing and finds its bearings in the walls thereof. The shaft 28 has a toothed wheel 29 fixed thereon and this wheel gears with a relatively large wheel 30 fixed on the driving shaft 24, which is supported partly in the side wall of the casing 11 and partly in a bracket 78. The shaft 24 extends outside the casing 11 to take the roller 14. The roller 14 is connected up to the roller 13 by a cord 31. The wheel 30 also engages with a wheel 32 mounted on a shaft 33 which also has fixed on it a chain wheel 34. The chain wheel 34 engages with and drives a chain 35 which in turn drives a chain wheel 36 on the spindle 9 on which the roll or drum 7 is mounted.

The drum 7 is provided at its edge nearest to the casing 11 with a groove which receives a cord 37 for driving a roller 38. The roller 38 is mounted on a spindle 39 which is supported in the wall of the casing 11 and fixed to pivot with arms 40. The arms 40 are counterbalanced by a weighted arm 41. The arms 40 also carry a roller 42 at their lower ends and this roller normally rests near the spindle 20 at its lowest point and on the side of the spindle remote from that by which the dough is fed. A band 43 passes around the rollers 38 and 42. The purpose of this band is to move or lap the strip of dough up to insure its engaging with the spindle 20. As the coil of dough increases in diameter, the arms 40 swing about the pivot 38 and the weight 44 of the arm 41 passes over the center. The arms 40 are then swung away and the band 43 and roller 42 are removed out of the path of the molded or stretched dough discharged from the spindle 20. Stops 45 and 46 limit the movement of the arm 41 and consequently of the band 43. The means for returning the band 43 to its initial position for lapping the dough around the spindle will be described later.

The wheel 30 engages with a further pinion 48 (see Fig. 1), which in turn engages with a pinion 49 both of which are mounted in the frame 22 which is loosely pivoted about the driving shaft 24. An arm 50 on the frame aids in supporting the pinions 48 and 49 with their spindles. The pinion 49 may conveniently have its central bore shaped to the shape of the spindle 20 on which it is mounted. In this way the spindle is rotated about its axis while it is free to swing with the loosely pivoted frame 22 about the pivot 24 as the coil of dough increases in diameter.

On the driving shaft 24 there is also mounted a pinion 51 which engages and drives a spur wheel 52 on a shaft 65. This shaft 65 has mounted loosely on it the timing cam 53 and has fixed on it a ratchet 54. The ratchet 54 is continuously rotating in the direction of the arrow 55. As the dough passes under the spindle 20, this spindle rises and thereby causes the frame 22 to oscillate about its pivot 24. An arm 56 connects the frame 22 to one arm 57 of an angle lever, the other arm 58 of which has a head piece engaging a pin 59 on a clutch pawl 60 pivoted at 61 to the timing cam 53. The rising of the frame 22 will thus liberate the pawl 60 which under the action of a spring 62 springs into engagement with the ratchet 54 thus forming an operative clutch connection whereby the cam 53 commences to rotate also in the direction of the arrow 55. It will be understood that the engagement of the clutch mechanism described is initiated by the strip of dough fed forward by the band 5 under the spindle 20. The cam 53 has two sloping bars 63 and 64 fixed thereon, which after a suitable number of revolutions of the spindle 20, come into operation to withdraw the spindle 20 within the casing 11 and thereby remove the dough therefrom. The action of withdrawal of the dough is thus also initiated by the fed strip itself. The number of revolutions is determined by the ratio of the gearing 30—51—52 and the gearing 30—48—49. In the form shown the small wheels 51, 48 and 49 are all one third of the large wheels 30 and 52. The ratio of the revolutions is thus 9:1. When the cam 53 has made practically a complete revolution or from about ⅞ths to ⅝ths of a revolution to be more accurate, the cam bar 63 comes into engagement with a pin or roller 66 on an arm 67 pivoted at 68 to the frame 22. The arm 67 thus swings from left to right in Fig. 2 and thereby through the arm 69 with its end 70 embracing the spindle 20 moves the spindle from its projecting position to a position within the casing 11. Shortly thereafter the cam 64 operates the arm 67 to return the spindle which is now in its lowest position owing to the molded dough having been discharged or separated from the spindle 20 and the pawl 60 is thus removed from engagement with the ratchet 54.

Practically at the same time as the cam bar 64 operates the arm 67, a cam rise 71 carried by and moving with the timing cam 53 comes into engagement with a lever 72, pressed by a spring 72ª, the lever being pivoted at 73, and having an arm 74 adapted to engage a push rod 75 guided to slide vertically in brackets 76. The upper end of the push rod 75 engages a pin 77 on the spindle 39 and thereby returns the band 38 and arms 40 into their operative position shown in Fig. 3 where the pivoted conveyer 43 is effective to lap the fed strip of dough around the spindle 20.

The outside edge of the dough may be retained in proper position on the spindle 20, by the means indicated in Fig. 4 where a moving band 100 is arranged in a vertical plane at right angles to the band 5 with its top edge about the height of the center of the spindle when a full clot has been wound on the spindle.

The band or conveyer 100 comes opposite the end of the spindle 20 in its projecting position. It may conveniently be mounted on columns 101 supported in brackets 102 and be driven from the shaft 9 by bevel wheels 103 and 104.

I claim—

1. In a machine for stretching dough, a rotary spindle to engage and wind the dough, means for feeding dough to the spindle and means operable by the dough to determine the number of turns applied by the spindle to the dough.

2. In a machine for stretching dough, means for feeding dough, a rotary spindle to engage and wind the fed dough, means for separating the wound dough from the spindle, and means operable by the dough to determine the number of turns applied to the dough by the spindle.

3. In a machine for stretching dough, a rotary spindle to engage and wind the dough, means for separating the wound dough from the spindle and means for timing the operation of said separating means to occur after a predetermined number of turns has been applied to the dough.

4. In a machine for stretching dough, a rotary spindle to engage and wind the dough, said spindle being movable axially and means for timing the axial movement of the spindle to occur after a predetermined number of turns has been applied to the dough.

5. In a machine for stretching dough, means for feeding dough, a rotary spindle to engage and wind the fed dough into a coil about itself, means for driving said spindle, means for withdrawing said spindle axially, a cam for operating said withdrawing means, a clutch for driving said cam, means for driving said clutch and means operated by the fed strip of dough for engaging said clutch with said cam.

6. In a machine for stretching dough, a rotary spindle to engage and wind the dough, driving means for said spindle, means for withdrawing said spindle axially, a cam for operating said means, a clutch for driving said cam, means for driving said clutch and means dependent upon the engagement of the dough with the spindle for throwing said clutch into engagement with its driving means.

7. In a machine for stretching dough, a rotary spindle, a pivoted frame in which said spindle is mounted to rotate and slide axially, means for moving said spindle axially, timing mechanism controlling the operation of said means and means, operable on the tilting of the frame supporting the spindle, for starting said timing mechanism.

8. In a machine for stretching dough, a rotary spindle, a pivoted frame in which said spindle is mounted to rotate and slide axially, means for counterbalancing said frame as desired, means for moving said spindle axially, timing mechanism controlling the operation of said means and means operable on the tilting of the frame supporting the spindle, for starting said timing mechanism.

9. In a machine for stretching dough, a driving shaft, a frame loosely pivoted about said driving shaft, a rotary spindle axially slidable in said frame, gearing from said shaft to said spindle and means for periodically moving said spindle axially.

10. In a machine for stretching dough, a driving shaft, a frame loosely pivoted about said driving shaft, means for counterbalancing said frame on the side of the pivot remote from said spindle, a rotary spindle axially slidable in said frame, gearing from said driving shaft to said spindle and means for periodically moving said spindle axially.

11. In a machine for stretching dough, a driving shaft, a frame loosely pivoted on said shaft, a rotary spindle axially slidable in said frame, a cam rotatable between the sides of the frame, a lever mounted on said frame and coöperating with said cam, and said spindle to slide the spindle axially, clutch mechanism for driving said cam and means operable by the tilting of said frame for engaging said clutch.

12. In a machine for stretching dough, a driving shaft, a frame loosely pivoted on said shaft, a rotary spindle axially slidable in said frame, a cam rotatable between the sides of the frame, a lever mounted on said frame and coöperating with said cam, and said spindle to slide the spindle axially, clutch mechanism for driving said cam, means operable by the tilting of said frame for engaging said clutch and a casing inclosing said mechanism and having an opening through which the rotary spindle projects in one position of its axial movement.

13. In a machine for stretching dough, a driving shaft, a frame loosely pivoted on said shaft, a rotary spindle axially slidable in said frame, a cam rotatable between the sides of the frame, a lever mounted on said frame and coöperating with said cam and said spindle to slide the spindle axially, clutch mechanism for driving said cam, means operable by the tilting of said frame for engaging said clutch, a casing inclosing said mechanism and having an opening through which the rotary spindle projects in one position of its axial movement and a moving conveyer band mounted externally to said casing at the side to which the spindle projects.

14. In a machine for stretching dough, a rotary spindle to engage and wind the dough, means for feeding dough to the spindle, means for lapping the dough around the spindle and means operable by the dough to determine the number of turns applied by the spindle to the dough.

15. In a machine for stretching dough, a rotary spindle to engage and wind the dough, a conveyer band to feed the dough to said spindle, said band passing directly beneath said spindle, a pivoted conveyer band located over the said feeding band and on the side of the spindle remote from that by which the dough is fed.

16. In a machine for stretching dough, a rotary spindle to engage and wind the dough, means for feeding dough to the spindle, means for lapping the dough around the spindle, means for separating the wound dough from the spindle, means for timing the operation of said separating means to occur after a predetermined number of turns has been applied to the dough and means operable with said timing means for bringing the lapping means into operative position.

17. In a machine for stretching dough, a rotary spindle to engage and wind the dough, a casing, mechanism within said casing for rotating said spindle and withdrawing said spindle axially from a projecting position to a position within the casing, a conveyer external to the casing and located directly beneath the spindle, a pivoted conveyer for lapping dough fed by said first mentioned conveyer around the spindle and means operable with the spindle withdrawing mechanism for bringing said pivoted conveyer into operative position.

18. In a machine for stretching dough, a rotary spindle to engage and wind the dough, a casing, mechanism within said casing for rotating said spindle and withdrawing said spindle axially from a projecting position to a position within the casing, a conveyer external to the casing and located directly beneath the spindle, a pivoted conveyer for lapping dough fed by said first mentioned conveyer around the spindle, a counterbalance weight for throwing said pivoted conveyer out of the path of the stretched dough discharged from said spindle subsequent to said lapping operation and means operable with the spindle withdrawing mechanism for bringing said pivoted conveyer into operative position.

19. In a dough stretching machine, a rotary spindle to engage and wind the dough, a casing, mechanism within said casing for rotating said spindle and withdrawing the same axially from a projecting position into a position within the casing, a conveyer located externally to said casing and passing beneath the spindle in its projecting position, and a conveyer at right angles to said first mentioned conveyer and located to pass the end of the spindle in its projecting position.

In testimony whereof I have signed my name to this specification in the presence of two subscribing witnesses.

LAURENCE EMBREY.

Witnesses:
VINCENT FLACKETT,
FRANK MODSLEY.

Copies of this patent may be obtained for five cents each, by addressing the "Commissioner of Patents. Washington, D. C."